United States Patent
Halabiya

Patent Number: 5,240,272
Date of Patent: Aug. 31, 1993

[54] VEHICLE HITCH ASSEMBLY

[75] Inventor: Sabah Halabiya, Rheinhausen, Fed. Rep. of Germany

[73] Assignee: Deere & Company, Moline, Ill.

[21] Appl. No.: 945,562

[22] Filed: Sep. 16, 1992

[30] Foreign Application Priority Data

Sep. 17, 1991 [DE] Fed. Rep. of Germany ....... 4130829

[51] Int. Cl.⁵ ............................................. B60D 1/01
[52] U.S. Cl. .................................. 280/479.1; 180/53.3; 37/231; 172/272
[58] Field of Search .................... 280/479.1; 180/53.3; 37/231; 172/272, 605

[56] References Cited

U.S. PATENT DOCUMENTS

| | | | |
|---|---|---|---|
| 2,968,494 | 1/1961 | Klouda | 280/479.1 X |
| 2,983,523 | 5/1961 | Kienzle | 172/272 |
| 3,572,759 | 3/1971 | Baugh | 172/272 |
| 3,863,955 | 2/1975 | Muncke et al. | 280/479.1 |
| 4,058,180 | 11/1977 | Dreyer | 180/53.3 |
| 4,887,680 | 12/1989 | Nozaka et al. | 180/53.3 |
| 4,905,769 | 3/1990 | Barnes et al. | 172/272 |

FOREIGN PATENT DOCUMENTS

| | | | |
|---|---|---|---|
| 0184489 | 11/1985 | European Pat. Off. | |
| 0963652 | 4/1957 | Fed. Rep. of Germany | 172/272 |
| 1249099 | 3/1968 | Fed. Rep. of Germany | |

Primary Examiner—Margaret A. Focarino
Assistant Examiner—Christopher P. Ellis

[57] ABSTRACT

A hitch for attaching an implement with a tongue to an agricultural vehicle has at least one spacer bar which is pivotally coupled to the vehicle body about a horizontal axis. A rear end of the spacer bar is pivotally connected to the middle area of a lift arm. A drawbar hook is connected to a rear end of the lift arm and the lift is pivotal about an axis to adjust the height of the drawbar hook. A lift mechanism is pivotally connected to a forward end of the lift arm. This lift mechanism draws the forward end of the lift arm generally upwards. The hitch operates so that the drawbar hook moves substantially vertically and then horizontally when moved from its lowest position to a work height.

8 Claims, 3 Drawing Sheets

VEHICLE HITCH ASSEMBLY

BACKGROUND OF THE INVENTION

The invention relates to a towing arrangement or hitch for prime movers, in particular for coupling implements with tow bars to an agricultural or utility vehicle.

Agricultural or utility vehicles, in particular, such as agricultural tractors, frequently contain a hitch so that implements can be coupled to and towed by the tractor. For this purpose a towing hook is provided on the prime mover, which is able to engage a clevis in the tow bar of the implement. For tow bars that must be raised from the ground for the coupling process there is an advantage in attaching the towing hook on the utility vehicle so as to be adjustable in height, so that the prime mover can be backed up and the towing hook engaged with the clevis of the tow bar, in order to perform the coupling process. After coupling the towing hook to the tow bar, the towing hook and the tow bar are lifted by a mechanical arrangement.

Certain standards must be observed in the case of tractors with power take-off shafts. For example, the ISO 500/6489 standard requires a fore-and-aft spacing distance of 100 millimeters between the towing hook and the end of the power take-off shaft. This means that the coupling point is located relatively close to the rear of the vehicle cab and is not always visible from the operator's seat, in particular when it is in its lower position. It would be desirable to simplify the coupling process by improving visibility of the coupling point.

In German patent reference DE 1 249 099, a coupling arrangement for tractors is shown in which two levers are arranged under the tractor body, each of which is pivoted at one end about a pin on the tractor body. A towing hook is provided at the other end of each lever. These levers can be raised and lowered by means of a lift shaft, lift arms, chains and drawbar. Thus, the towing hooks move in a circular arc about the axis of the pins. In the lowered position, the towing hooks are located close to the rear of the tractor and are not visible from the operator's seat.

Another similar hitch is shown in European Patent publication EP 0 184 489. In this known hitch the towing hook is pivotally coupled to the vehicle chassis by a pair of spaced apart pivoting links. One link is coupled to the forward end of the towing hook and the other link is coupled to a central portion of the towing hook. The two links determine the curved path through which the towing hook moves as it is raised and lowered. The towing hook is raised by a lifting arrangement which includes a telescoping rod that is attached to a lift rod in the vicinity of the towing hook.

In this hitch the lift lever is located below the vehicle body and thereby reduces the ground clearance of the vehicle. Furthermore, in this location the arrangement is subject to an increased danger of dirt accumulation during operation. Because in its lowered position the towing hook extends further beyond the rear of the tractor than in its locked position, it may, therefore, be visible from the operator's seat in its lowered position. However, during lifting the towing hook is rapidly retracted and disappears from the operator's visual field. That means that the operator is able to capture the clevis of the tow bar only with considerable difficulty when the tow bar is not in the lowest position of the hitch.

SUMMARY OF THE INVENTION

Accordingly, an object of this invention is to provide a hitch of the aforementioned type in which the towing hook is visible from the operator's seat during the entire lifting operation.

Another object of this invention is to provide a hitch which is protected from dirt accumulation during operation.

Another object of this invention is to provide a hitch which can be manufactured at low cost and which meets the requirements of standards.

These and other objects are achieved by the present invention wherein a hitch is built with simple, generally strap-shaped parts connected by joints. The hitch includes at least one spacer pivoted about a horizontal axis from the chassis of the prime mover. Its rear end engages the central region of a lift lever which can be pivoted about a horizontal axis with respect to the spacer. A towing hook is mounted on the aft end of the lift lever. The height of the lift lever can be controlled by pivoting the lift lever. At the second end of the lift lever a joint is provided.

The lift lever is positioned behind the rear of the vehicle, but not under the vehicle body. The lift lever is generally oriented vertically, with an upper end somewhat forward of the lower end with respect to the direction of travel of the vehicle. Therefore, in a locked condition the vehicle ground clearance is not impaired and the danger of dirt accumulation is largely avoided.

The lift lever can be guided in such a way that the towing hook initially moves in a vertical direction. Then, shortly before reaching the operating height, the towing hook changes direction and moves generally in horizontal direction to the operating position. This motion makes possible a constant visual inspection of the coupling point from the operator's seat during its raising or lowering.

In a preferred embodiment at least two connecting links are pivotally connected to each other between a controllable lift arm and the upper end of the lift lever. These links operate as a chain. They transmit tensile forces, but can buckle when the towing hook is locked in its operating position and the lift arm is lowered. This makes it possible for the lift arm or a lift shaft engaging the lift arm to be used also for the operation of other devices, for example, steering arms, without the need for unlocking the components of the hitch.

A stop is provided between the lift arm and one of the connecting links so as to make possible a freely pivoting motion between lift arm and connecting link in the first phase of motion during lifting, but so as to lock the connecting link to the lift arm in a second phase of motion. This shifts the point of engagement from the end of the lift arm to the end of the connecting link in the second phase of motion, and hence the direction of the force applied to the pivoted lift lever is changed. This hitch can be manufactured at low cost and is easy to install.

DETAILED DESCRIPTION

Figure 1:
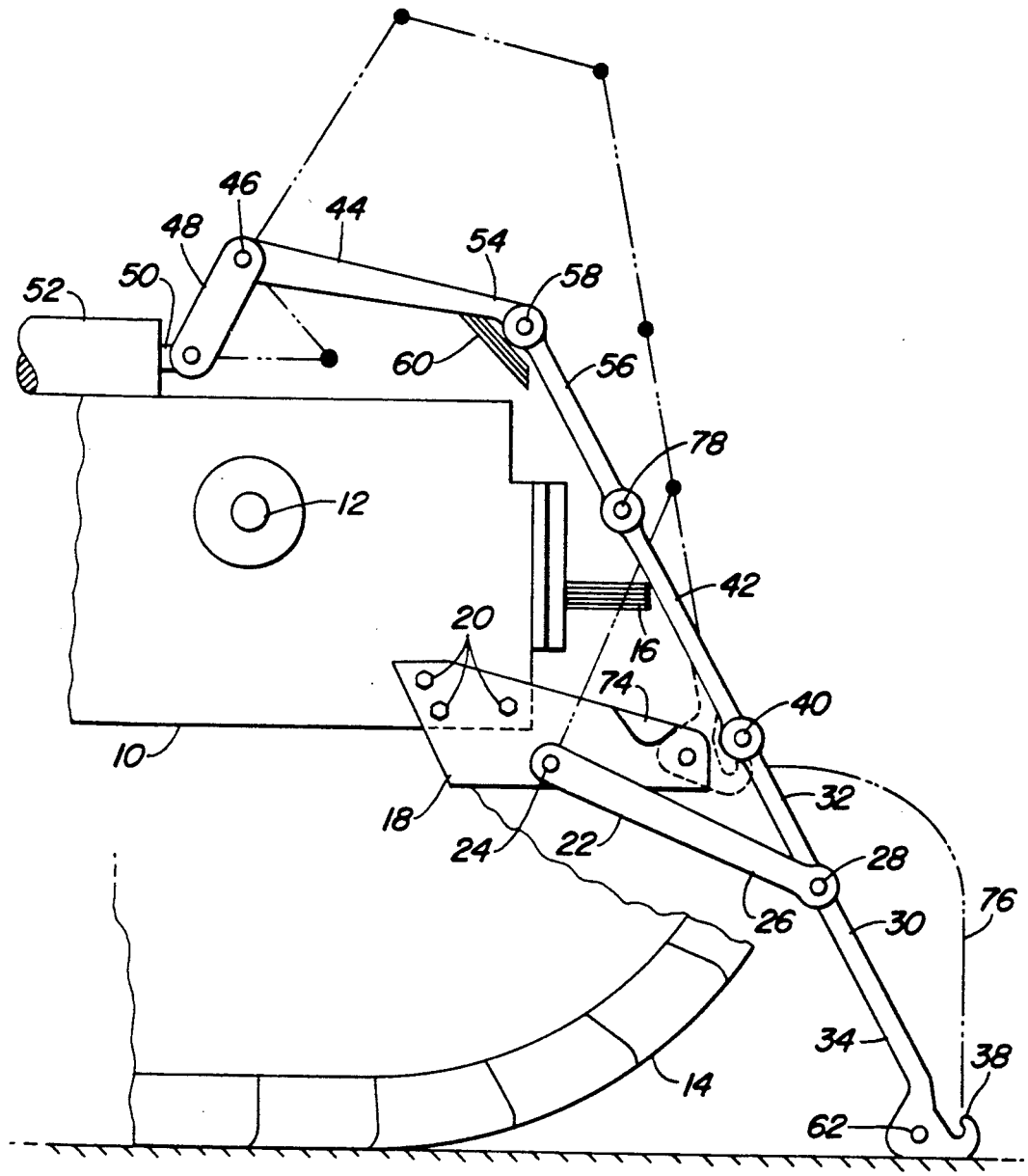
FIG. 1 shows a schematic side view of the rear region of a vehicle with a hitch according to the invention with the towing hook lowered.

The center of FIG. 1 shows the gearbox housing 10 of an agricultural tractor, not shown in any further detail. The gearbox housing 10 is part of the support structure (chassis) of the agricultural tractor. A rear axle 12 drives the rear wheels 14, also shown only partially.

A power take-off shaft 16 projects from the rear of the gearbox housing 10, for driving a towed implement (not shown). A retaining plate 18 is attached by bolts 20 to each side of the rear lower region of the gearbox housing 10. The retaining plates 18 extend to the rear beyond the rear end of the gearbox housing.

One end of a spacer 22 is attached to each of the retaining plates 18 so that each spacer 22 can pivot in vertical direction about a horizontal axis 24. The other end 26 of each spacer 22 is connected to the center region of a corresponding one of the lift levers 30 by the horizontal pivot axes 28 arranged to either side of the gearbox housing 10.

Figure 3:
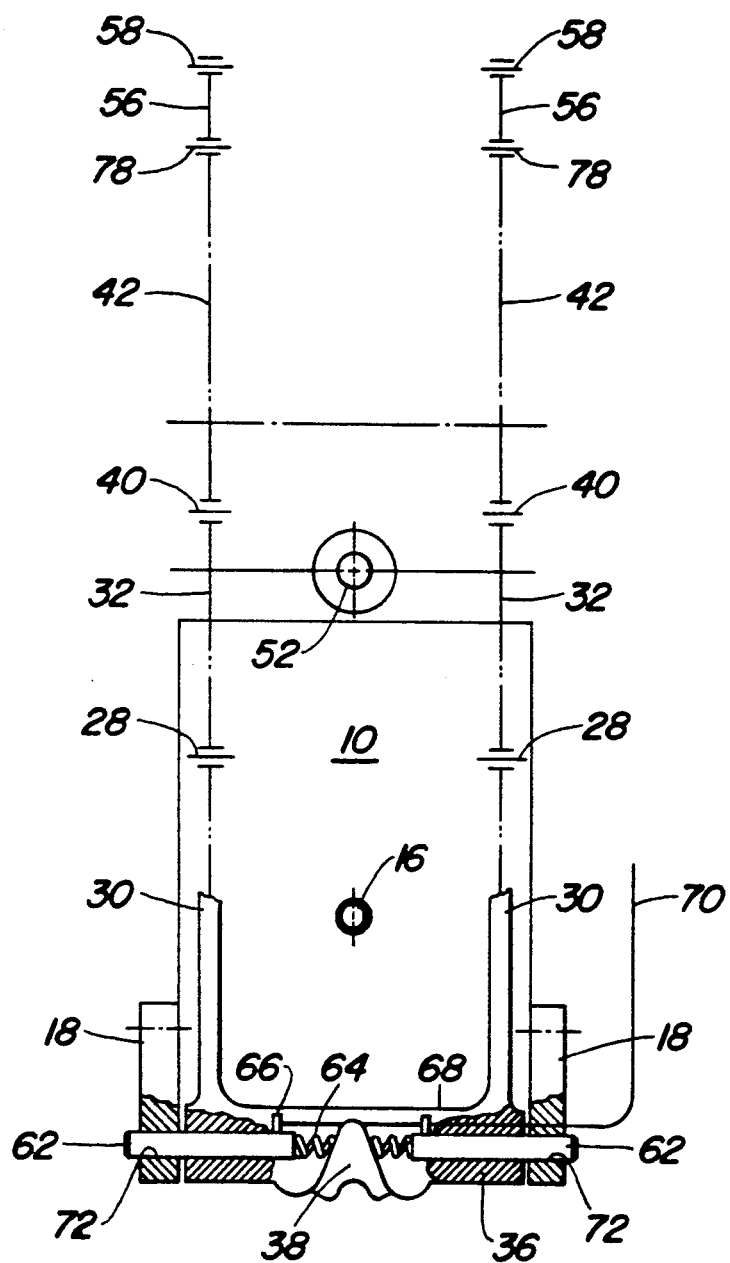
FIG. 3 shows the schematic view of a hitch according to FIG. 2 as seen from the rear of the vehicle.

The lift levers 30 are configured as metal straps with their upper ends 32 positioned above and forward of their lower ends 34. As best seen in FIG. 3, the lower ends 34 of the lift levers 30 are coupled to a towing plate 36 which carries a towing hook 38. Each upper end 32 is pivotally coupled to a connecting link 42 by a joint 40.

A pair of bell crank-shaped lift arms 44 are pivoted from a fixed horizontal axis 46 which is located above the gearbox housing 10 in the region of the greatest width of the gearbox housing 10. One leg 48 of each lift arm 44 is connected to a piston rod 50 of an associated hydraulic cylinder 52 so that the lift arm 44 can be pivoted about the axis 46 by the hydraulic cylinder 52. In place of the lift arms 44, extended lift arms (not shown) could be used that are directly swung about a pivot by a power-driven lift shaft. The other end 54 of each lift arm 44 is pivotally coupled by joint 58 to a second strap-shaped connecting link 56, which in turn is pivotally coupled to a corresponding one of the connecting links 42.

Figure 2:
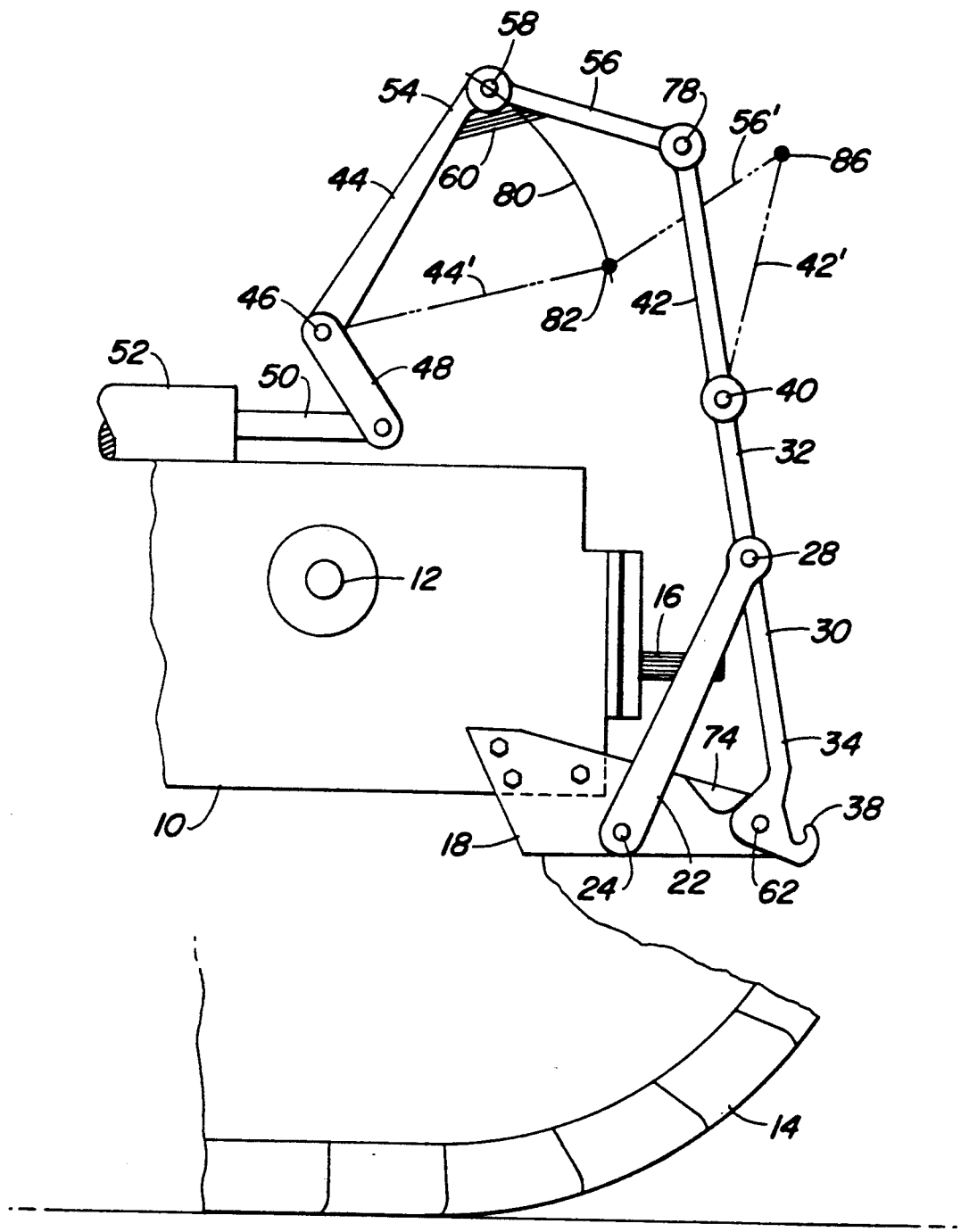
FIG. 2 shows a hitch according to FIG. 1 with a towing hook in operating position.

A stop 60 is attached to each of the lift arms 44 near the joint 58, and extends toward the second connecting link 56. The length of stop 60 is such that the swing angle between the lift arm 44 and the second connecting link 56 is limited to a predetermined amount, as is illustrated by FIG. 2.

Referring now to FIG. 3, a pair of locking pins 62 are supported by the towing plate 36 on each side of the towing hook 38, and a helical spring 64 urges the pins away from each other. The locking pins 62 carry retainers 66, 68 which are coupled to a push-pull cable 70. In the unloaded condition the outer ends of the locking pins 62 project beyond the side surfaces of the towing plate 36. By operating the push-pull cable 70 the two locking pins 62 can be moved towards each other against the force of spring 64 so that their outer ends no longer project beyond the side surfaces of the towing plate 36. The locking pins 62 make possible a locking of the towing plate 36, and therewith also the towing hook 38, to the retaining plates 18, wherein the locking pins 62 engage corresponding bores 72 in the retaining plates 18, as is illustrated in FIG. 3. Pulling on the push-pull cable 70 retracts the locking pins 62 and the lock is released.

When the towing hook 38 reaches its locked position its backside engages a stop 74 which is provided between the retaining plates 18. This stop 74 limits rotation of the towing hook 38 in the clockwise direction past the position shown in FIG. 2).

FIG. 1 shows the lift mechanism in a position with the towing hook 38 lowered to its lowest position on the ground. By extending the piston rod 50 from the hydraulic cylinder 52 the lift arms 44 are rotated about the axis 46 in a counterclockwise direction. The ends of lift arms 44, acting through the second and first connecting links 56, 42, pull the lift levers 30 upward and at a slight forward angle and therewith the towing plate 36 and the towing hook 38. At this time, the connecting links 56, 42 and the lift lever 30 are aligned along a line established by the position of the joints 40 and 58. The joint 58 moves in a circular arc about the axis 46 so that the connecting links 42, 56 and the lift arm 30 are moved to a more nearly vertical orientation of during the lifting.

As the lift arms 30 are lifted, the pivot axis 28 is moved upward in a circular arc, the radius of which is determined by the length of the spacer 22. Due to the movement of pivot axis 28 and the movement of the joint 58, the towing hook 38 initially moves substantially vertically as it is lifted. After the spacer 22 has rotated past a horizontal position, the towing hook 38 begins to move horizontally forward, whereupon the rotation of the lift lever 30 in clockwise direction is accelerated. As a result, the towing hook 38 follows the curved path 76.

This effect is amplified with a certain lift curve in which the angle between the lift arm 44 and the second connecting links 56 has become so small that the stops 60 come into contact with the second connecting links 56 and lock the joints 58.

As a result of the action of the stops 60, the point of alignment of the line formed by the lift levers and connecting links no longer lies in the joint 58, which had described a circle arc about the axis 56, upon further lifting, but in the connecting joint 78 between the first and the second connecting links 42, 56. During further lifting these joints 78 describe a circular arc about the axis 46. In the upper lifting region, therefore, the orientation of the lift levers 30 rapidly becomes more vertical, so that the towing hook 38 moves substantially horizontally as it nears the fully raised position shown in FIG. 2.

When the towing hook 38 finally reaches its operating position, the locking pins 62 are unlocked by the push-pull cable 70 and are forced into the bores 72 by the helical spring 64. The engagement of the locking pins 62 in the retaining plates 18 locks the towing hook 38. The locked position is shown in FIG. 2, and indicated for emphasis with dot-dashed line in FIG. 1.

During operation both locking pins 62 absorb the tensile loads as well as the support forces of the towed implement. Thereby the lift arms 44, connecting links 42, 56 and lift levers 30 remain unloaded during towing. Thus, in the locked position, the lift arms 44 can be used for the operation of other devices, such as steering arms, without the necessity of unlocking the connecting links 42, 56 or the lift levers 30.

The connecting links 42, 56 may be buckled into the position shown in FIG. 2 by the dot-dashed lines 44' and 56'. In this buckled position no force is transmitted from the lift arms 44 to the lift levers 30. The joint 58 moves downward in the circular arc 80 with respect to axis 46 to the point 82. Simultaneously, the joint 78 moves in a circular arc about the joint 40 until it reaches the position 86. The dot-dashed lines 44', 56' and 42' illustrate the new positions of the lift arms and the connecting links.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A hitch for coupling an implement with a tow bar to a vehicle, the hitch having a spacer pivoted about a horizontal axis from a chassis of the vehicle, a lift lever having a central portion pivotally coupled to an end of the spacer, and having a rear end for connecting to an adjustable height towing hook, characterized by:
   a lifting mechanism comprising a lift arm pivoted, about a horizontal axis from the chassis and a connection link pivotally coupled to an end of the lift arm and pivotally coupled to a forward end of the lift lever for lifting the forward end of the lift lever generally upward.

2. The hitch of claim 1, wherein:
   the lift lever and the lifting mechanism cooperate so that the towing hook is moved initially in a general vertically upward direction during lifting from a lowest position and so that the towing hook is moved toward an operating position shortly before reaching an operating height.

3. The hitch of claim 1, wherein:
   the at least one pivoted connecting link comprises a first link and a second link pivotally coupled to each other.

4. The hitch of claim 1, characterized by:
   a stop member limits movement of the connecting link relative to the lift arm.

5. The hitch of claim 1, characterized by:
   the lift arm comprises a leg which is connected to a piston rod of an associated hydraulic cylinder so that the lift arm can be pivoted about the horizontal axis.

6. The hitch of claim 1, characterized by:
   a central portion of the lift arm is pivotally coupled to the chassis of the vehicle.

7. A hitch for coupling an implement with a tow bar to a vehicle, the hitch having a spacer pivoted about a horizontal axis from a chassis of the vehicle, a lift lever having a central portion pivotally coupled to an end of the spacer, and having a rear end for connecting to an adjustable height towing hook, characterized by:
   a lifting mechanism pivotally coupled to a forward end of the lift lever for lifting the forward end of the lift lever generally upward, the lifting mechanism comprising a lift arm pivoted about a horizontal axis from the chassis and a pivoted connecting link couples an end of the lift arm to the forward end of the lift lever, the pivoted connecting link comprising a first link and a second link pivotally coupled to each other.

8. A hitch assembly for coupling an implement with a tow bar to a chassis of a vehicle, the hitch assembly comprising:
   a spacer having a forward end pivotally coupled to the chassis and pivotal about a horizontal axis and having a rearward end;
   a lift lever having a central portion pivotally coupled to the rearward end of the spacer, a rearward end for connecting to an adjustable height towing hook and a forward end; and
   a lifting mechanism comprising a lift arm pivoted about a horizontal axis from the chassis and a connection link pivotally coupled to an end of the lift arm and pivotally coupled to the forward end of the lift lever for lifting the forward end of the lift lever generally upward.

* * * * *